US008059765B2

(12) United States Patent
Törmälehto (10) Patent No.: US 8,059,765 B2
(45) Date of Patent: Nov. 15, 2011

(54) METHOD AND APPARATUS TO DETECT RANDOM ACCESS CHANNEL PREAMBLE

(75) Inventor: Jukka Törmälehto, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 933 days.

(21) Appl. No.: 12/070,957

(22) Filed: Feb. 21, 2008

(65) Prior Publication Data

US 2009/0213968 A1   Aug. 27, 2009

(51) Int. Cl.
*H04L 27/06* (2006.01)
(52) U.S. Cl. ........ 375/343; 370/320; 370/335; 370/342; 370/441; 370/479; 370/515; 708/422
(58) Field of Classification Search .................. 375/343; 370/320, 335, 342, 441, 479, 515; 708/422
See application file for complete search history.

(56) References Cited

U.S. PATENT DOCUMENTS

| 6,363,107 | B1* | 3/2002 | Scott ............................ 375/150 |
| 7,113,538 | B1* | 9/2006 | Chen et al. ..................... 375/150 |
| 7,643,537 | B1* | 1/2010 | Giallorenzi et al. ........... 375/142 |
| 7,688,878 | B2* | 3/2010 | Wang et al. .................... 375/130 |
| 2004/0170197 | A1* | 9/2004 | Mehta ........................... 370/504 |
| 2004/0228424 | A1* | 11/2004 | Baldwin et al. ............... 375/343 |
| 2008/0310561 | A1* | 12/2008 | Song et al. ..................... 375/343 |
| 2009/0003308 | A1* | 1/2009 | Baxley et al. .................. 370/350 |
| 2009/0191875 | A1* | 7/2009 | Vujcic et al. ................... 455/436 |
| 2009/0325513 | A1* | 12/2009 | Iwai et al. ....................... 455/91 |

FOREIGN PATENT DOCUMENTS

| EP | 1178638 A1 * | 2/2002 |
| WO | WO 2008/081311 A2 | 7/2007 |
| WO | WO 2008/084381 A1 | 7/2008 |

OTHER PUBLICATIONS

3GPP TS 36.300, V8.3.0 (Dec. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release8), 121 pgs.
3GPP TS 36.321, V8.0.0 (Dec. 2007), 3rd Generation Partnership Project; Technical Specification Group Radio Access Network; Evolved Universal Terrestrial Radio Access (E-UTRA) Medium Access Control (MAC) protocol Specification (Release 8), 23 pgs.

* cited by examiner

*Primary Examiner* — Juan A Torres
(74) *Attorney, Agent, or Firm* — Harrington & Smith (57) ABSTRACT

A method (and operation of a computer program and an apparatus) includes receiving a signal over a wireless channel; correlating the received signal with a reference sequence and providing a correlation output; processing the correlation output to detect a presence of a first predetermined preamble sequence using a main correlation peak and two first order frequency shift peaks and nulling second and higher order frequency shift peaks from the correlation output prior to further processing the correlation output to detect a presence of a second predetermined preamble sequence.

26 Claims, 8 Drawing Sheets

METHOD AND APPARATUS TO DETECT RANDOM ACCESS CHANNEL PREAMBLE

TECHNICAL FIELD

The exemplary and non-limiting embodiments of this invention relate generally to wireless communication systems, methods, devices and computer programs and, more specifically, relate to techniques for receiving uplink random access transmissions from a communication device.

BACKGROUND

Various abbreviations that appear in the specification and/or in the drawing figures are defined as follows:
  3GPP third generation partnership project
  UTRAN universal terrestrial radio access network
  Node B base station
  UE user equipment
  EUTRAN evolved UTRAN (also referred to as LTE)
  LTE long term evolution
  aGW access gateway
  eNB EUTRAN Node B (evolved Node B)
  MAC medium access control
  MM mobility management
  PDU protocol data unit
  PRB physical resource block
  PHY physical
  RLC radio link control
  RRC radio resource control
  RRM radio resource management
  PDCP packet data convergence protocol
  HARQ hybrid automatic repeat request
  C-RNTI cell radio network temporary identifier
  RA-RNTI random access radio network temporary identifier
  ACK acknowledge
  NACK not acknowledge
  OFDMA orthogonal frequency division multiple access
  SC-FDMA single carrier, frequency division multiple access
  UL uplink
  DL downlink
  FSP frequency shift peak
  RACH random access channel
  zC Zadoff-Chu
  IDFT inverse discreet Fourier transform
  PDSCH physical downlink shared channel
  PDCCH physical downlink control channel
  PRACH physical random access channel A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to these and other issues related to the invention is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

Figure 1A:
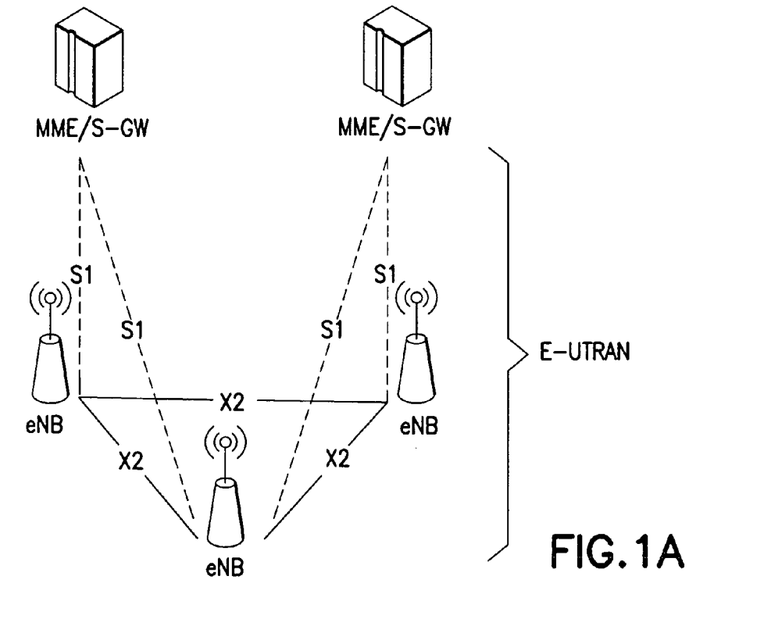
FIG. 1A reproduces FIG. 4 of 3GPP TS 36.300, and shows the overall architecture of the E-UTRAN system.

FIG. 1A reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
  functions for Radio Resource Management: Radio Bearer Control, Radio Admission Control, Connection Mobility Control, Dynamic allocation of resources to UEs in both uplink and downlink (scheduling);
  IP header compression and encryption of user data stream;
  selection of a MME at UE attachment;
  routing of User Plane data towards Serving Gateway;
  scheduling and transmission of paging messages (originated from the MME);
  scheduling and transmission of broadcast information (originated from the MME or O&M); and
  measurement and measurement reporting configuration for mobility and scheduling.

Reference can also be made to 3GPP TS 36.321, V8.0.0 (2007-12), 3rd Generation Partnership Project; Technical Specification Group Radio Access Network; Evolved Universal Terrestrial Radio Access (E-UTRA) Medium Access Control (MAC) protocol specification (Release 8).

Figure 1B:
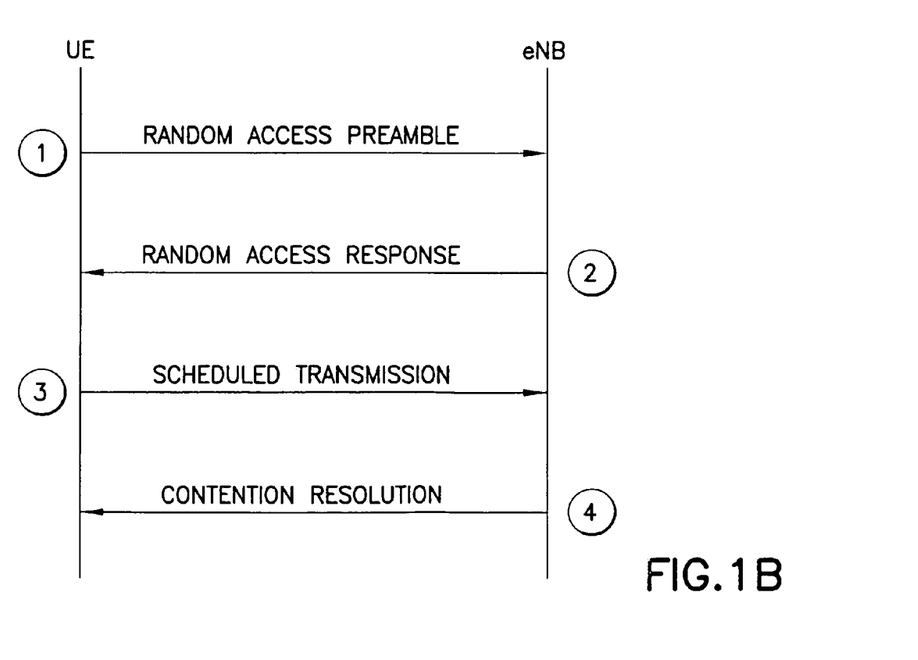
FIG. 1B reproduces Figure 10.1.5.1-1: Connection based Random Access Procedure, of 3GPP TS 36.300.

Of particular interest herein is the random access procedure of the LTE (E-UTRA) system. The procedure is described in 3GPP 36.300 v.8.3.0, and its steps are shown in FIG. 1B, which reproduces Figure 10.1.5.1-1: Connection based Random Access Procedure, of 3GPP TS 36.300. The steps shown in FIG. 1B are described in detail in subclause 10.1.5.1 of 3GPP TS 36.300.

Briefly, the UE transmits a random access preamble and expects a response from the eNB in the form of a so-called Message 2. Message 2 is transmitted on the PDSCH and its resources are allocated on the PDCCH as for any DL message. The resource allocation of Message 2 is addressed with an identity RA-RNTI that is associated with the frequency and time resources of a PRACH, but is common for the different preamble sequences. The Message 2 contains UL allocations for the transmissions of a Message 3 in the UL (step 3 of the random access procedure).

It should thus be appreciated that the LTE system as currently proposed will require a RACH preamble detection algorithm at the eNB. Related to RACH preamble detection, a LTE cellular network that supports high-speed UEs will require careful planning, since the 3GPP specifications require supporting mobile speeds at least up to 350 km/h. It these speeds Doppler induced frequency offsets between the UE and the eNB can be significant.

Zadoff-Chu (ZC) sequences have been selected as preamble sequences for LTE. One reason for this is that one primary (mother) ZC sequence, due to its ideal cyclic auto-correlation properties, can be used to generate several preamble sequences. However, ZC sequences are known to be sensitive to frequency offsets induced by, for example, Doppler shift. Detecting received preambles at the eNB becomes more challenging as the frequency offset increases. This is due at least in part to the fact that additional correlation peaks appear in the time domain at the output of the receiver correlation function. From a system performance point of view this can lead to increased numbers of false alarm events, e.g., network resources are scheduled by the eNB to non-existent UEs due to the false detection of UL RACH signals.

The degradation of the auto-correlation properties leads to the appearance of FSPs in the correlation output. From the receiver point of view the energy of a preamble sequence transmitted by a given UE is dispersed amongst a main correlation peak and several FSPs. When the frequency offset exceeds about 625 Hz the energy contained in the strongest FSP can actually exceed the energy of the main correlation peak. The FSPs can be particularly problematic since the cyclic shifted versions of one ZC sequence are used as different preambles. As a result one or more FSPs may be incorrectly identified as being actual correlation peaks of another preamble sequence generated from the same mother ZC sequence. Hence, the numbers of false alarm events tend to increase as the auto-correlation properties degrade. This problem is particularly troublesome when the SNR at the receiver is high, since FSPs are more exposed behind the noise floor and, therefore, an incorrect decision concerning the presence of a preamble in the received signal becomes more probable.

SUMMARY OF THE EXEMPLARY EMBODIMENTS

The foregoing and other problems are overcome, and other advantages are realized, in accordance with the non-limiting and exemplary embodiments of this invention.

In accordance with first aspects of the exemplary embodiments of this invention a method (and the operation of a computer program) includes receiving a signal over a wireless channel; correlating the received signal with a reference sequence and providing a correlation output; processing the correlation output to detect a presence of a first predetermined preamble sequence using a main correlation peak and two first order frequency shift peaks and nulling second and higher order frequency shift peaks from the correlation output prior to further processing the correlation output to detect a presence of a second predetermined preamble sequence.

In accordance with a further aspect of the exemplary embodiments of this invention there is provided an apparatus that includes a wireless receiver; a correlator configurable to correlate a received signal with a reference sequence to provide a correlation output; and a processor configurable to process the correlation output in the time domain to detect a presence of a first predetermined preamble sequence using a main correlation peak and two first order frequency shift peaks. The processor is further configurable to null higher order frequency shift peaks from the correlation output prior to further processing of the correlation output to detect a presence of a second predetermined preamble sequence.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIGS. 7A and 7B, collectively referred to as FIG. 7, show another logic flow diagram that illustrates in greater detail the operation of the method, and the result of the execution of computer program instructions by the data processor shown in FIG. 2.

DETAILED DESCRIPTION

A practical solution to accommodate both low speed and high speed UEs is to provide two separate receiver implementations or embodiments: one to support low speed UEs and the other to support high speed UEs. The exemplary embodiments of this invention pertain most particularly to, but are not limited for use only with, the high speed receiver embodiment.

The exemplary embodiments of this invention provide for organizing a preamble detection stage of a receiver for a high-speed UE in such a manner that detection and false alarm performance are not seriously affected. Disturbances induced by frequency offset appear as frequency shift peaks (FSP) at the output of a correlation function. The location (sample index) of a FSP is predictable, since it depends only on the index of a ZC sequence. As a result unwanted FSPs may be cancelled in order to decrease the number false alarm events.

Reference can be made to PCT IB08/00037, filed 9 Jan. 2008, entitled "Apparatus, Method and Computer Program Product for Detecting Non-synchronized Random Access Channel Preamble", Kari Hooli, Juha S. Korhonen, Kari Pajukoski and Esa Tiirola, and to PCT IB07/04134, filed 28 Dec. 2007, entitled "Apparatus, Methods and Computer Program Products Providing Limited Use of Zadoff-Chu Sequences in Pilot or Preamble Signals", Kari Hooli, Kari Pajukoski, Esa Tiirola and Juha S. Korhonen.

The exemplary embodiments of this invention further improve and extend the advantages of the approaches described in these two pending applications by at least providing enhanced processing of higher order FSPs (order 2 and above).

It is noted that at present there is no rigid definition of a "high-speed" UE, at least for the reason that LTE cells are currently considered to be configurable for operation in a "normal" or a "high-speed" mode for RACH. The high-speed mode does not depend on the speed of any one particular UE. Further, at present there is no definition of an average speed.

Figure 2:
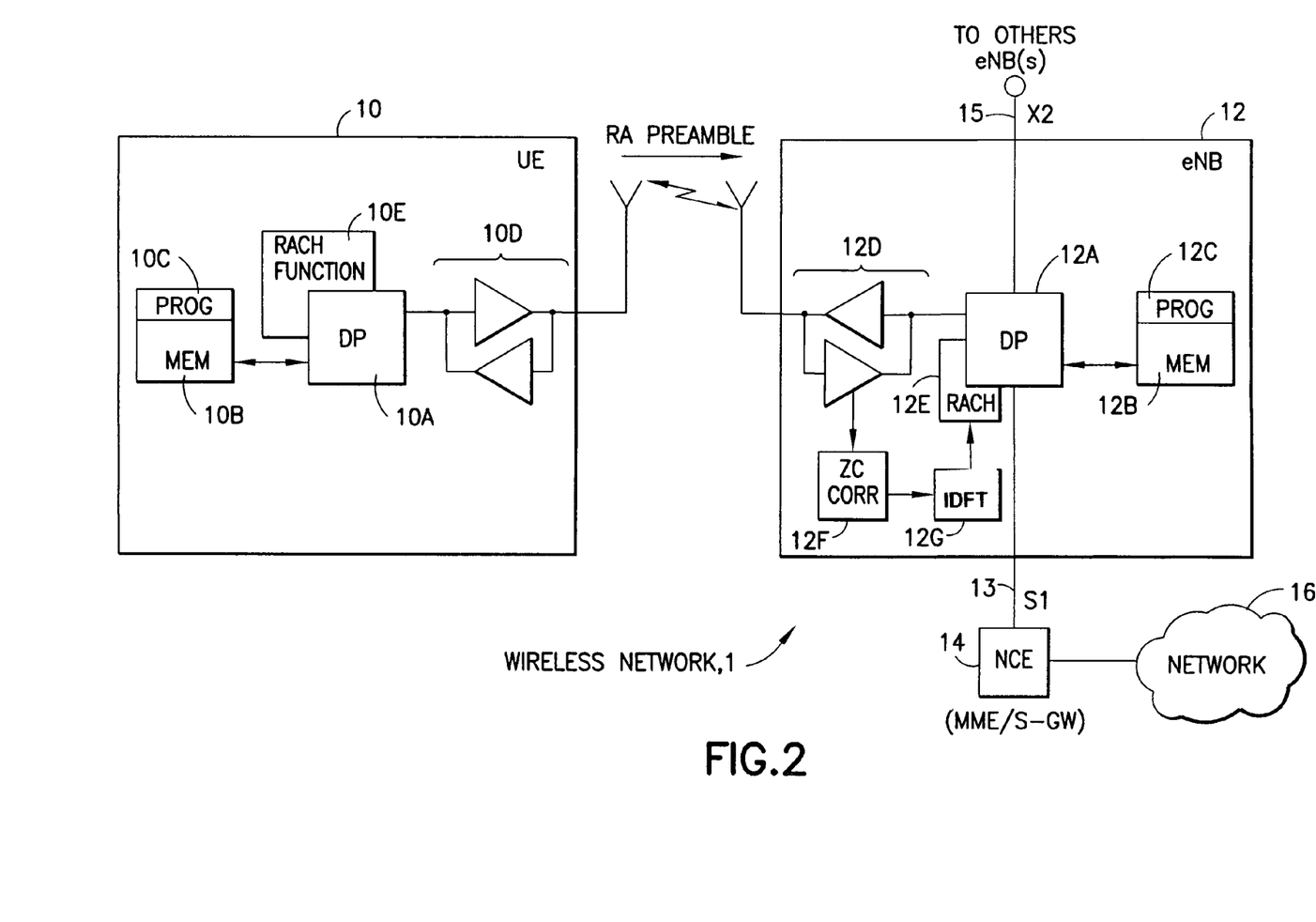
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14, which may be implemented as the S1 interface shown in FIG. 1A. An instance of the X2 interface 15 may be present for coupling to another eNB (not shown). At least the PROG 12C may be assumed to include program instructions that, when executed by the associated DP 12A, enable the electronic device to operate in accordance with the exemplary embodiments of this invention, as will be discussed below in greater detail.

The exemplary embodiments of this invention may be implemented at least in part by computer software executable by the DP 12A of the eNB 12, or by hardware, or by a combination of software and hardware (and firmware).

For the purposes of describing the exemplary embodiments of this invention the UE 10 may be assumed to also include a RACH functional unit 10E, and the eNB 12 also includes a RACH functional unit 12E. The RACH functional units 10E, 12E, which may form a part of the MAC functionality of each of the UE 10 and the eNB 12, are assumed to be constructed and operated in accordance with the exemplary embodiments of this invention. Further in this regard the eNB 12 includes as part of (or associated with) the receiver portion of the transceiver 12D a ZC correlator (CORR) 12F and an IDFT unit 12G. Exemplary embodiments of the ZC correlator 12F and IDFT unit 12G may be implemented at least in part by computer software, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 10 serviced by the eNB 12. The UEs 10 may or may not be identically constructed, but in general are all assumed to be electrically and logically compatible with the relevant network protocols and standards needed for operation in the wireless network 1.

The exemplary embodiments of this invention may use the first order FSPs to aid preamble detection, as is done in the above-referenced PCT IB08/00037. In addition, higher order FSPs may be cancelled as part of the detection algorithm.

Figure 5:
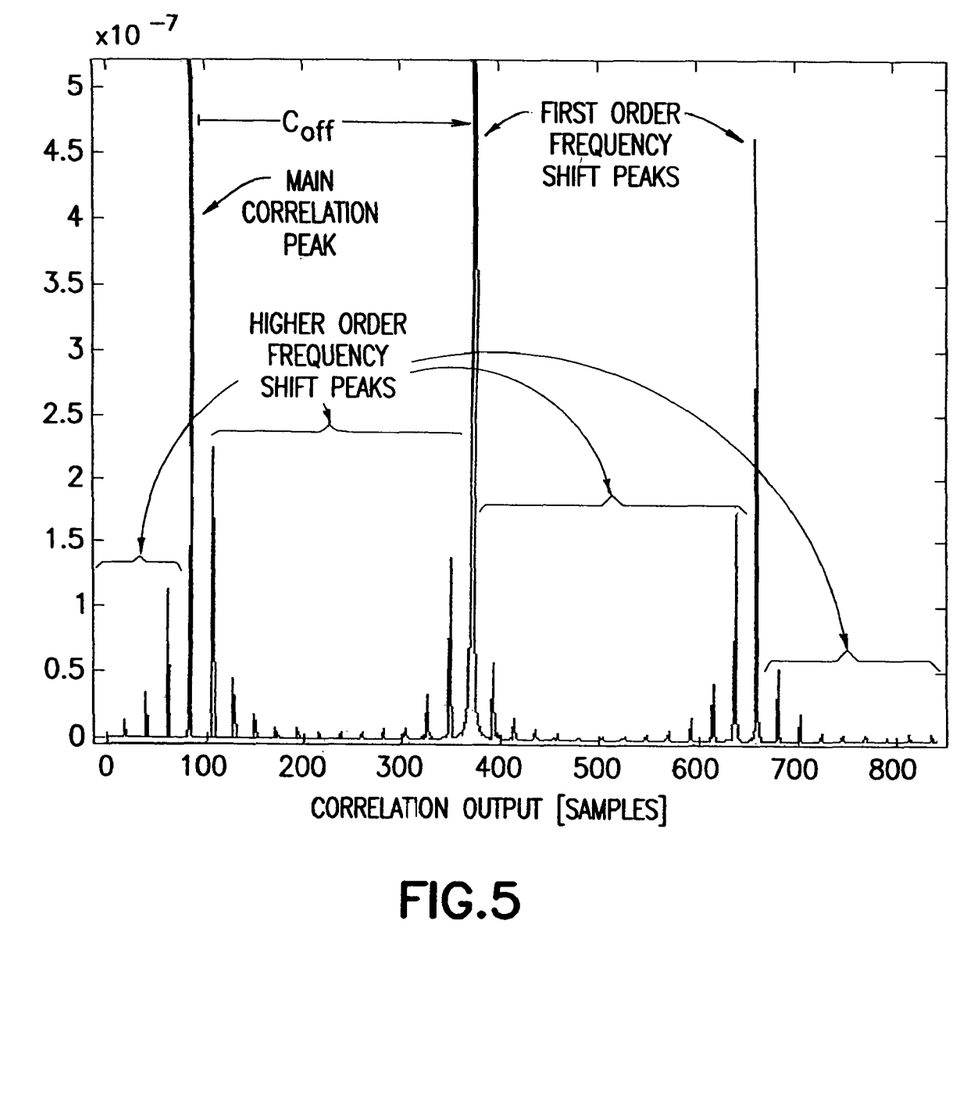
FIG. 5 depicts a non-limiting example of the output of the ZC correlation and IDFT blocks in FIG. 2, and is useful in understanding the relationship between a main correlation peak, first order FSPs, and higher order FSPs.

FIG. 5 depicts a non-limiting example of the output of the ZC correlation unit 12F and the IDFT block 12G in FIG. 2, and is useful in understanding the relationship between the main correlation peak, the first order FSPs and the higher order FSPs.

A ZC sequence specific cyclic shift offset $c_{off}$ can be calculated as $$c_{off} = (N_G m - 1)/u,$$

where $N_G$ is the length of the sequence, u is the index of the mother sequence and m is the smallest positive integer for which $c_{off}$ is an integer. The distance between a main correlation peak index $d_0$ and a k:th order FSP can be calculated from the equations:

$$d_{k+} = (d_0 + k c_{off}) \bmod N_G, \text{ and}$$

$$d_{k-} = (d_0 - k c_{off}) \bmod N_G,$$

where $d_{k+}$ is the location of the k:th order FSP in a positive direction and $d_{k-}$ is the location in a negative direction (where the correlation output may be seen as being the x-axis). Depending on the sign of the frequency offset, the FSPs are more dominant in the positive or negative direction from $d_0$, e.g., whether the UE 10 is moving towards the eNB 12 or away from the eNB 12. The magnitude of the frequency offset determines the magnitude of the FSPs relative to the main correlation peak.

Figure 3:
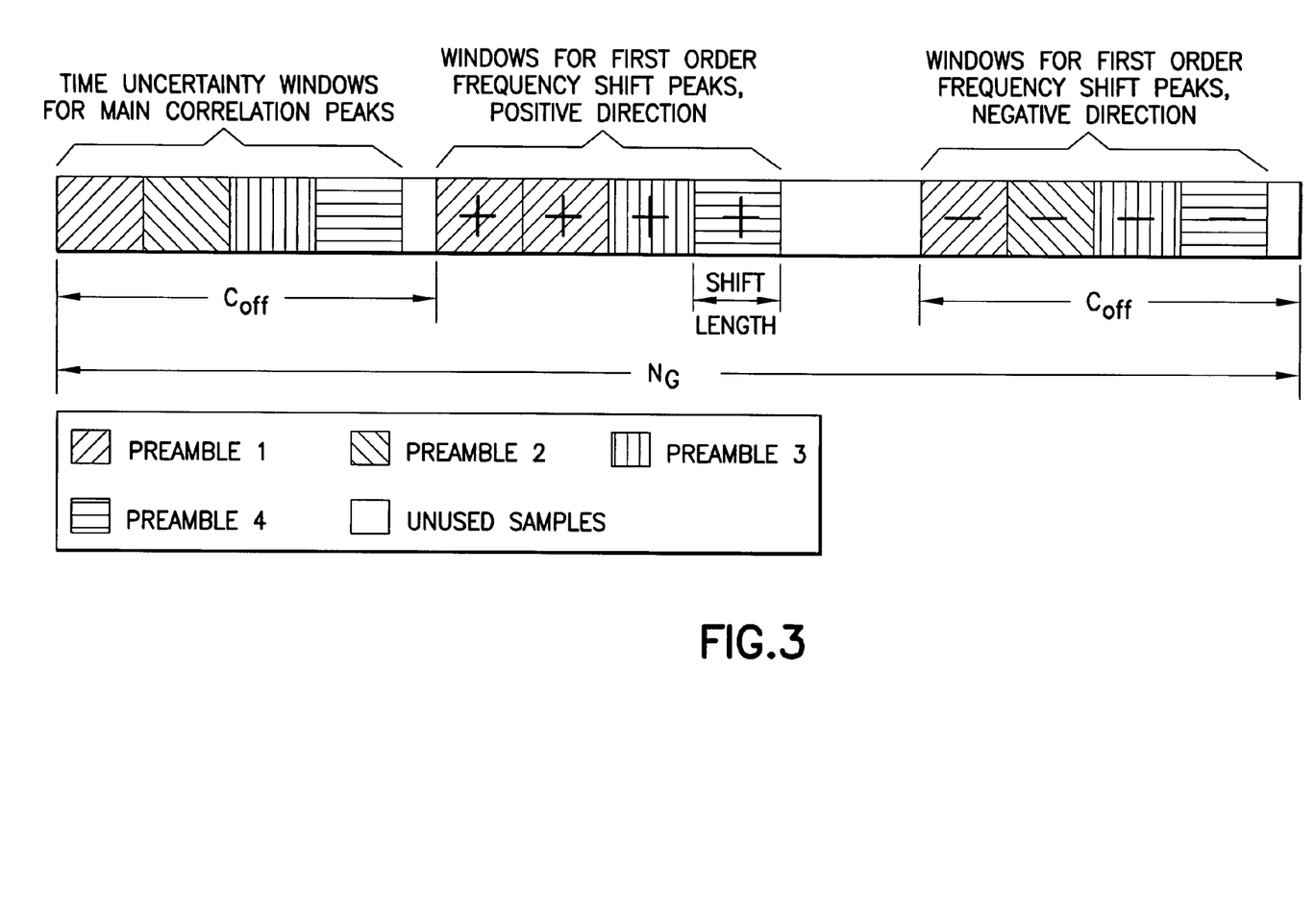
FIG. 3 depicts an example of limiting cyclic shifts (samples) in preamble generation.

As a basis for operation in a cell supporting high-speed UEs 10, the exemplary embodiments assume that restricted sets of signature sequences are used in preamble generation. In this regard mother ZC sequences and their cyclic shifted versions are selected such that first order FSPs do not interfere with the main correlation peak or with each other. This process is explained in the above-referenced PCT IB07/04134. As a result, non-overlapping time uncertainty areas belonging to the main correlation peak and two first order FSPs in the correlation output are known. Reference in this regard may be made to FIG. 3. As opposed to combining the three uncertainty windows belonging to one preamble, the exemplary embodiments of this invention exploit the fact that $d_0$, $d_{1+}$ and $d_{1-}$ can be calculated from one another in the receiver of the eNB 12 by using the equations presented above. The main detection peak and two first order FSPs are used in preamble detection, and the higher order FSPs are cancelled before detecting a next preamble. The goal of this procedure is to reduce false alarm events, as discussed in further detail below.

Figure 6:
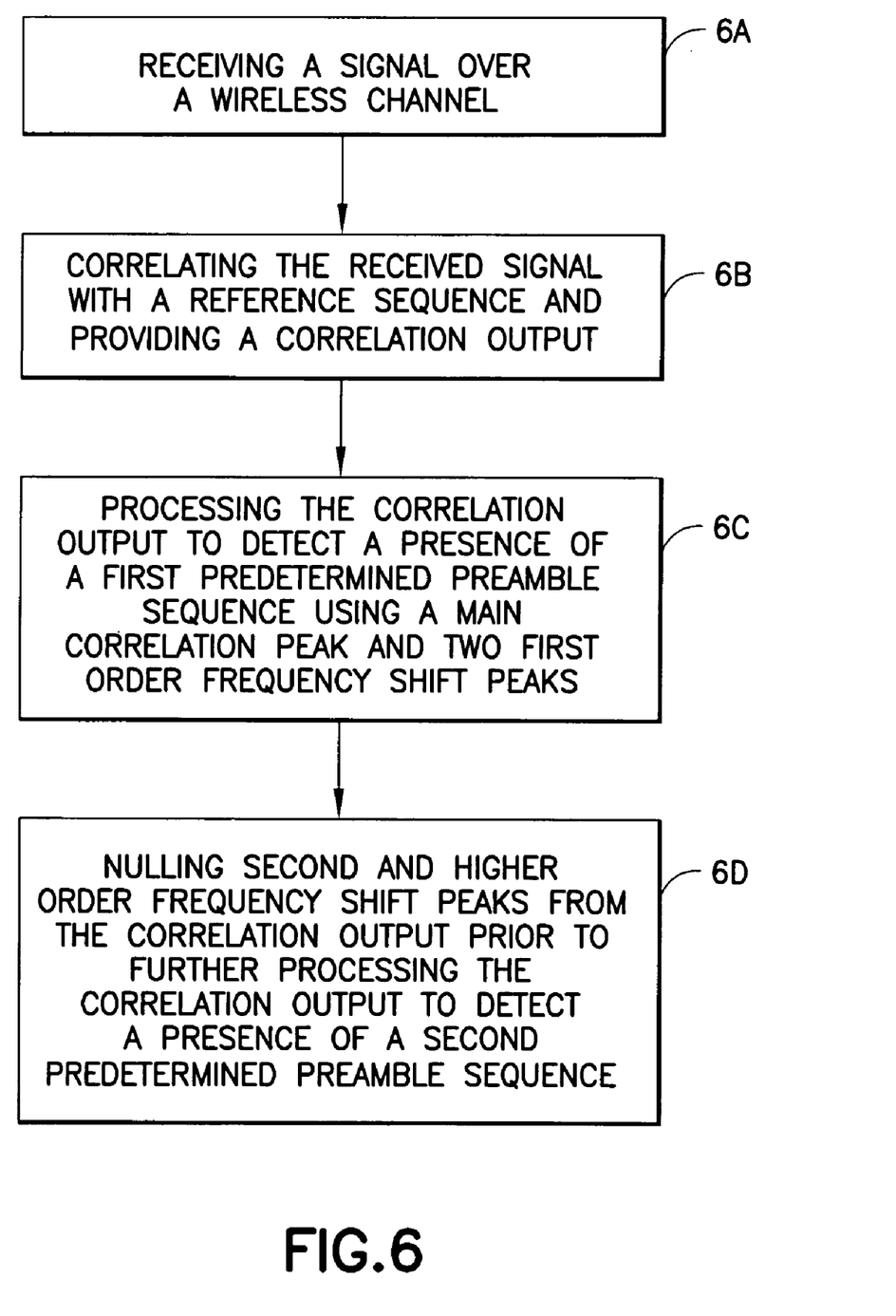
FIG. 6 is a logic flow diagram that illustrates the operation of a method, and the result of execution of computer program instructions by the data processor shown in FIG. 2.

An exemplary embodiment of a preamble detection algorithm has the following steps (referring to FIG. 6):

6A: receiving a signal over a wireless channel;

6B: correlating the received signal with a reference sequence and providing a correlation output;

6C: processing the correlation output to detect a presence of a first predetermined preamble sequence using a main correlation peak and two first order frequency shift peaks; and 6D: nulling second and higher order frequency shift peaks from the correlation output prior to further processing the correlation output to detect a presence of a second predetermined preamble sequence.

Figures 7, 7A:
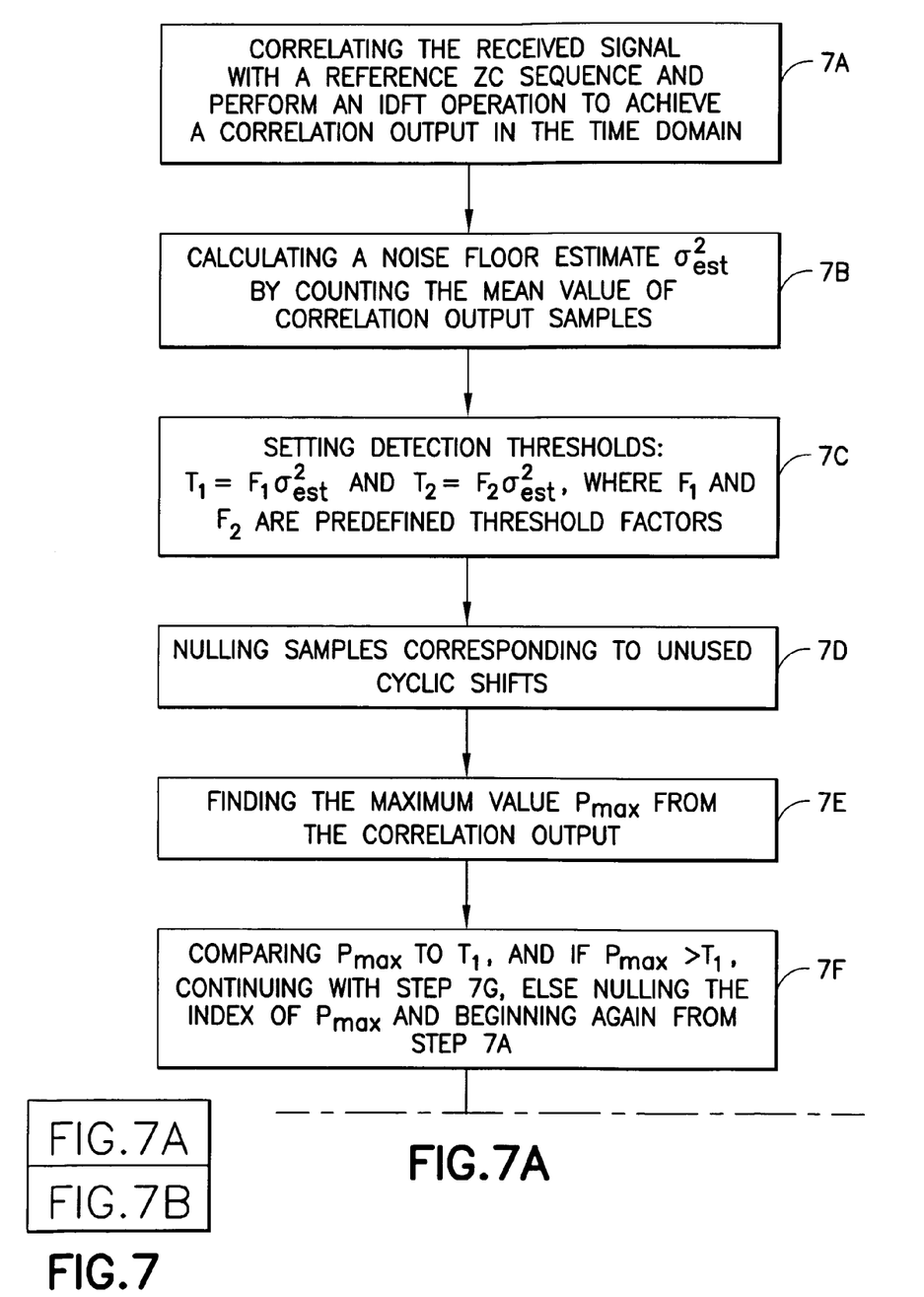
Figure 7B:
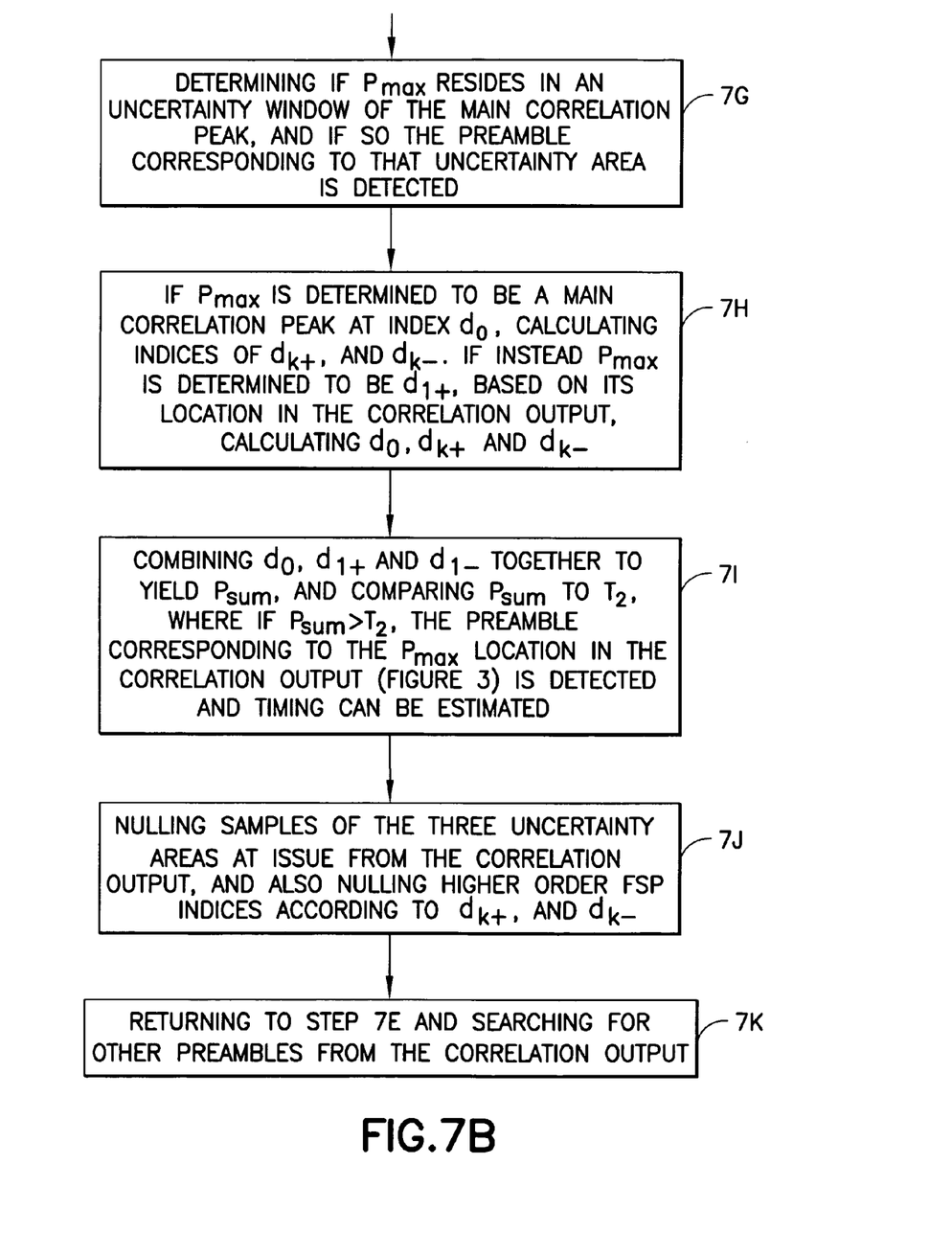

The exemplary embodiment of the preamble detection algorithm can be described in more detail as having the steps of (referring to FIG. 7):

7A: Correlating the received signal with a reference ZC sequence and perform an IDFT operation to achieve a correlation output in the time domain (see blocks 12F and 12G of FIG. 2).

7B: Calculating a noise floor estimate $\sigma_{est}^2$ by counting the mean value of correlation output samples. Note that the highest correlation peaks that exceed a certain level may be excluded from the mean calculation to achieve a more accurate noise estimate.

7C: Setting two detection thresholds: $T_1 = F_1 \sigma_{est}^2$ and $T_2 = F_2 \sigma_{est}^2$, where $F_1$ and $F_2$ are predefined threshold factors (one or both of which may be adjusted by preliminary simulations). It should be noted in this regard that it may be desirable to set minimum values for $T_1$ and $T_2$. These minimum values may be based on a highest peak in the correlation output, and minimum values for $T_1$ and $T_2$ are not allowed to be greater than some certain magnitude beneath this value.

7D: Nulling samples corresponding to unused cyclic shifts (see FIG. 3).

7E: Finding the maximum value $P_{max}$ from the correlation output.

7F: Comparing $P_{max}$ to $T_1$, and if $P_{max}>T_1$, continuing the algorithm, else nulling the index of $P_{max}$ and beginning again from step 7A by correlating the received signal with a next reference sequence.

7G: Determining if $P_{max}$ resides in an uncertainty window of the main correlation peak, and if so the preamble corresponding to that uncertainty area is detected. Note in this regard that the presented detection algorithm also provides good support for low speed UEs 10. The timing may be estimated by measuring the distance in samples from the index of $P_{max}$ to the beginning of the uncertainty area.

7H: If $P_{max}$ is determined to be a main correlation peak at index $d_0$, calculating indices of $d_{k+}$ and $d_{k-}$. If instead $P_{max}$ is determined to be $d_{1+}$ based on its location in the correlation output, calculating $d_0$, $d_{k+}$ and $d_{k-}$. Parameter k determines how the order of FSPs to be searched.

7I: Combining $d_0$, $d_{1+}$ and $d_{1-}$ together to yield $P_{sum}$, and comparing $P_{sum}$ to $T_2$, where if $P_{sum}>T_2$, the preamble corresponding to the $P_{max}$ location in the correlation output (FIG. 3) is detected and timing can be estimated.

7J: Nulling samples of the three uncertainty areas at issue from the correlation output, and also nulling higher order FSP indices according to $d_{k+}$ and $d_{k-}$.

7K: Returning to step 7E (i.e., find the maximum value $P_{max}$ from the correlation output), and searching for other preambles from the correlation output.

Note that the various blocks shown in FIGS. 6 and 7 may be viewed as method steps, and/or as operations that result from operation of computer program code, and/or as a plurality of coupled logic circuit elements constructed to carry out the associated function(s).

There are several implementation-related aspects to the detection algorithm described above. For example, since $N_G$ is a prime number the IDFT operation following the correlation in the eNB 12 receiver cannot be implemented efficiently with its most logical length $N_G$. The block size of the IDFT unit 12G ($N_{IDFT}$) is preferably interpolated and thus the correlation output length does not match $N_G$ length. This may lead to a situation where uncertainty area lengths, their starting samples and $c_{off}$-parameter differ between the preamble generation and the receiver. One possible solution is to scale by $N_{IDFT}/N_G$ at the receiver. However, this may result in some inaccuracy during detection. For this reason in the algorithm step 7I it is reasonable to take into account also the samples around the calculated $d_0$, $d_{1+}$ and $d_{1-}$. For example, if $d_0$ is calculated from $d_{1+}$ or $d_{1-}$, the algorithm may find the maximum value between correlation output samples $d_0-1$, $d_0$ and $d_0+1$, and then choose the corresponding sample index as a new $d_0$.

As another example, and for the inaccuracy reason, nulling of higher order FSP samples at algorithm step 7J is preferably performed for indices $d_{k+}-1$, $d_{k+}$, $d_{k+}+1$, and similarly $d_{k-}-1$, $d_{k-}$, $d_{k-}+1$. Since the channel delay spread also affects the FSPs, it is reasonable to also null one or more samples following $d_{k+}+1$ and $d_{k-}+1$, at least for the $2^{nd}$ order FSPs which are the strongest.

As another implementation-related example, there is a possibility that the procedure of nulling FSP samples can result in a loss of energy from another preamble. Therefore, the order k is preferably not made larger than is necessary. This loss of energy may become a more important issue when the cell size is small and the cyclic shift length between different preambles is small as well. Attention is preferably paid to dimensioning, particularly when there is high load of simultaneous RACH UEs 10 within the cell.

With regard to the foregoing implementation issues note that one may exploit the knowledge that the energy of FSPs decreases as the order k increases. As a result, the condition to null may be set so that, for example, $d_{2+}$ is removed only if $d_{2+}<d_{1+}$. One may also always use the original correlation output from the algorithm step 7E as the source of $d_0$, $d_{1+}$ and $d_{1-}$, when summing samples for $P_{sum}$.

One particular advantage that is realized by the use of these exemplary embodiments of the invention relates to the processing of the higher order FSPs that is embedded in the detection algorithm. The computational complexity is modest, since the algorithm at step 8F prevents unnecessary algorithm continuation when there are no potential preamble peaks remaining in the correlation output.

Figure 4:
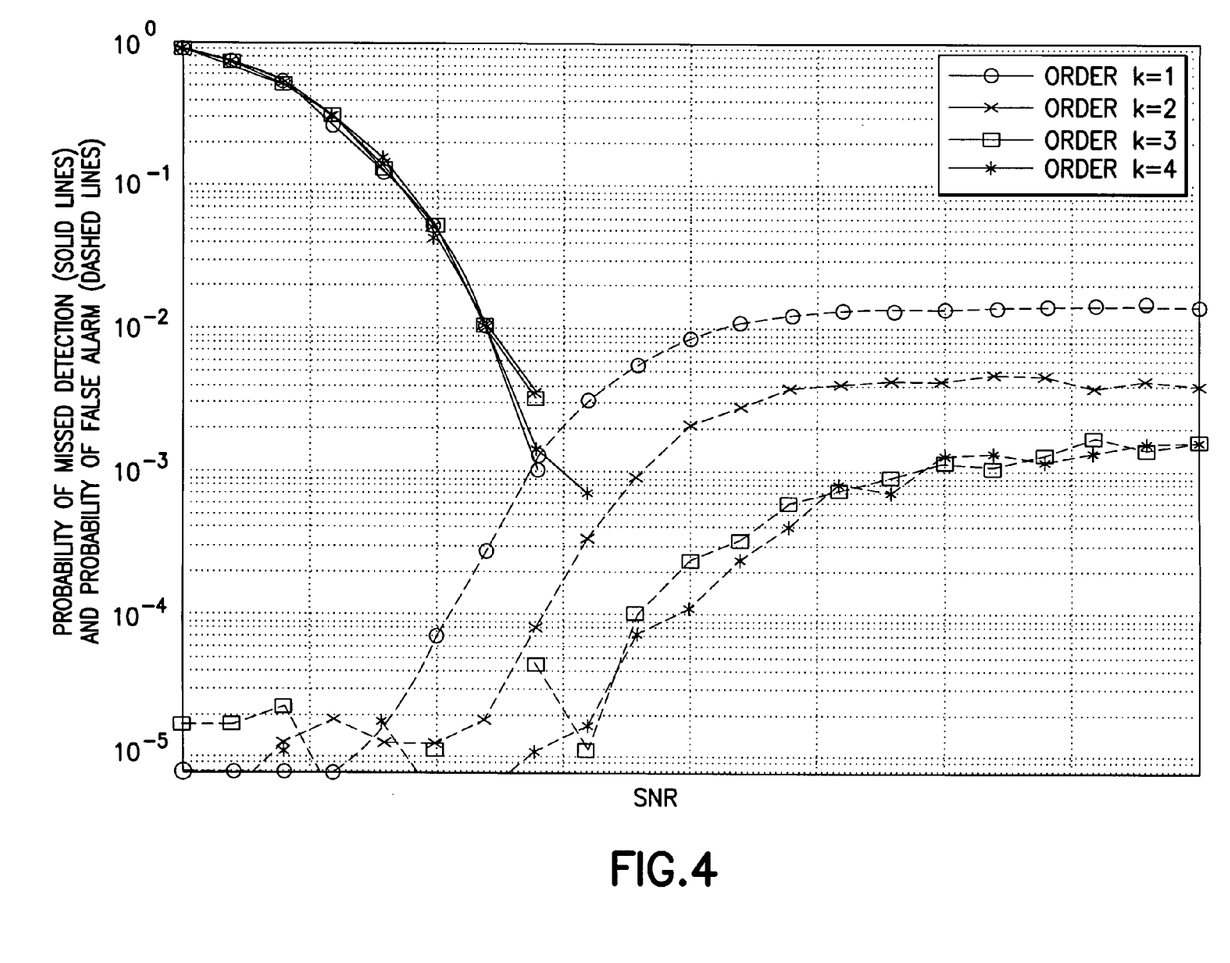
FIG. 4 presents missed detection and false alarm probabilities when different orders of frequency shift peaks are processed, and assumes a 70 km/h TU channel, frequency offset 450 Hz, 1 RACH user/access slot.

Other advantages relate to enhanced missed detection and false alarm performance. Reference in this regard can be made to FIG. 4 for showing performance in a 70 km/h TU channel. This Figure clearly shows the effectiveness of the exemplary embodiments in reducing false alarms.

It can be noted that the processing of FSPs of orders k=3 and/or 4 could be beneficial. If k is selected to be 1, the first order FSPs are used in detection, and any higher order FSPs are not removed.

The exemplary embodiments of this invention also encompass an apparatus that comprises means for receiving a signal over a wireless channel; means for correlating the received signal with a reference sequence for providing a correlation output; and means for processing the correlation output to detect a presence of a first predetermined preamble sequence using a main correlation peak and at least one first order frequency shift peak, said processing means comprising means for higher order frequency shift peaks from the correlation output prior to further processing the correlation output to detect a presence of a second predetermined preamble sequence.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 7 may be executed in other than the order shown, and certain of the computations described may be performed in other ways. However, all such and similar modifications of the teachings of this invention will still fall within the scope of this invention.

Further, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
   receiving a signal over a wireless channel;
   correlating the received signal with a reference sequence and providing a correlation output;
   processing the correlation output to detect a presence of a first predetermined preamble sequence using a main correlation peak and two first order frequency shift peaks; and
   nulling second and higher order frequency shift peaks from the correlation output prior to further processing the correlation output to detect a presence of a second predetermined preamble sequence.

2. The method of claim 1, where the steps of correlating and processing comprise:
   correlating the received signal with a reference Zadoff-Chu (ZC) sequence and performing an inverse discrete Fourier transform (IDFT) operation to achieve a correlation output in the time domain;
   calculating a noise floor estimate $\sigma_{est}^2$ by counting the mean value of correlation output samples; and
   setting two detection thresholds: $T_1=F_1\sigma_{est}^2$ and $T_2=F_2\sigma_{est}^2$, where $F_1$ and $F_2$ are predefined threshold factors.

3. The method of claim 2, where the step of calculating comprises excluding correlation peaks that exceed a certain level.

4. The method of claim 2, where the step of processing further comprises:
   nulling samples of the received signal that correspond to unused cyclic shifts.

5. The method of claim 2, where the step of processing further comprises:
   finding a maximum value $P_{max}$ from the correlation output; and
   comparing $P_{max}$ to $T_1$, and when $P_{max}>T_1$, continuing the method else nulling the index of $P_{max}$ and beginning again by correlating the received signal with a next reference sequence.

6. The method of claim 5, where when the method is continued further comprising:
   determining when $P_{max}$ resides in an uncertainty window of the main correlation peak, and when so the preamble corresponding to that uncertainty area is detected.

7. The method of claim 5, where when $P_{max}$ is determined to be a main correlation peak at index $d_0$, calculating indices of $d_{k+}$ and $d_{k-}$, while when instead $P_{max}$ is determined to be $d_{1+}$ based on its location in the correlation output, calculating $d_0$, $d_{k+}$ and $d_{k-}$, where k determines the order of frequency shift peaks to be searched, where a sequence-specific cyclic shift offset $c_{off}$ is calculated as $$c_{off}=(N_G m-1)/u,$$

where $N_G$ is the length of the sequence, u is the index of a mother sequence and m is a smallest positive integer for which $c_{off}$ is an integer,
where a distance between a main correlation peak index $d_0$ and a k:th order frequency shift peak is calculated from:

$$d_{k+}=(d_0+kc_{off}) \bmod N_G, \text{ and}$$

$$d_{k-}=(d_0-kc_{off}) \bmod N_G,$$

where $d_{k+}$ is the location of the k:th order frequency shift peak in a positive direction and $d_{k-}$ is the location in a negative direction.

8. The method of claim 7, further comprising:
   combining $d_0$, $d_{1+}$ and $d_{1-}$ together to yield $P_{sum}$, and comparing $P_{sum}$ to $T_2$, where when $P_{sum}>T_2$, a sequence corresponding to the $P_{max}$ location in the correlation output is detected and timing can be estimated.

9. The method of claim 8, where the step of nulling comprises:
   nulling samples of three uncertainty areas from the correlation output; and
   nulling the second and higher order frequency shift peak indices according to $d_{k+}$ and $d_{k-}$.

10. The method of claim 9, further comprising finding the maximum value $P_{max}$ from the correlation output and searching for other sequences from the correlation output.

11. The method of claim 8, where combining takes into account samples around the calculated $d_0$, $d_{1+}$ and $d_{1-}$.

12. The method of claim 11, where when $d_0$ is calculated from $d_{1+}$ or $d_{1-}$, further comprising finding a maximum value between correlation output samples $d_0-1$, $d_0$ and $d_0+1$, and selecting the corresponding sample index as a new $d_0$.

13. The method of claim 9, where nulling of the second and higher order frequency shift peak indices is performed at least for indices $d_{k+}-1$, $d_{k+}$, $d_{k+}+1$, $d_{k-}-1$, $d_{k-}$, $d_{k-}+1$.

14. The method of claim 9, where nulling of the second and higher order frequency shift peak indices is performed such that $d_{2+}$ is nulled only when $d_{2+} < d_{1+}$.

15. The method of claim 1, where the received signal comprises a random access preamble that is transmitted from a mobile communication apparatus and that is received at a network access node.

16. The method of claim 15, where the random access preamble is comprised of a Zadoff-Chu (ZC) sequence.

17. A non-transitory computer-readable memory medium that stores program instructions the execution of which results in operations that comprise:
   correlating a received signal with a reference sequence and providing a correlation output;
   processing the correlation output to detect a presence of a first predetermined preamble sequence using a main correlation peak and two first order frequency shift peaks; and
   nulling second and higher order frequency shift peaks from the correlation output prior to further processing the correlation output to detect a presence of a second predetermined preamble sequence.

18. The non-transitory computer-readable memory medium of claim 17, where the operations of correlating and processing comprise:
   correlating the received signal with a reference Zadoff-Chu (ZC) sequence and performing an inverse discrete Fourier transform (IDFT) operation to achieve a correlation output in the time domain;
   calculating a noise floor estimate $\sigma_{est}^2$ by counting the mean value of correlation output samples;
   setting two detection thresholds: $T_1 = F_1 \sigma_{est}^2$ and $T_2 = F_2 \sigma_{est}^2$, where $F_1$ and $F_2$ are predefined threshold factors; and
   nulling samples of the received signal that correspond to unused cyclic shifts;
   where the operation of calculating comprises excluding correlation peaks that exceed a certain level.

19. The non-transitory computer-readable memory medium of claim 18, where the operation of processing further comprises:
   finding a maximum value $P_{max}$ from the correlation output; and
   comparing $P_{max}$ to $T_1$, and when $P_{max} > T_1$, continuing the operations else nulling the index of $P_{max}$ and beginning again by correlating the received signal with a next reference sequence;
   where when the operations are continued further comprising:
   determining when $P_{max}$ resides in an uncertainty window of the main correlation peak, and when so the preamble corresponding to that uncertainty area is detected;
   where when $P_{max}$ is determined to be a main correlation peak at index $d_0$, calculating indices of $d_{k+}$ and $d_{-}$, while when instead $P_{max}$ is determined to be $d_{1+}$ based on its location in the correlation output, calculating $d_0$, $d_{k+}$ and $d_{k-}$, where k determines the order of frequency shift peaks to be searched, where
   a sequence-specific cyclic shift offset $c_{off}$ is calculated as $$c_{off} = (N_G m - 1)/u$$

where $N_G$ is the length of the sequence, u is the index of a mother sequence and m is a smallest positive integer for which $c_{off}$ is an integer,
   where a distance between a main correlation peak index $d_0$ and a k:th order frequency shift peak is calculated from:

$$d_{k+} = (d_0 + k c_{off}) \bmod N_G, \text{ and}$$

$$d_{k-} = (d_0 - k c_{off}) \bmod N_G,$$

where $d_{k+}$ is the location of the k:th order frequency shift peak in a positive direction and $d_{k-}$ is the location in a negative direction;
   further comprising operations of:
   combining $d_0$, $d_{1+}$ and $d_{1-}$ together to yield $P_{sum}$, and comparing $P_{sum}$ to $T_2$, where when $P_{sum} > T_2$, a sequence corresponding to the $P_{max}$ location in the correlation output is detected and timing can be estimated.

20. The non-transitory computer-readable memory medium of claim 19, where the operation of nulling comprises:
   nulling samples of three uncertainty areas from the correlation output; and
   nulling the second and higher order frequency shift peak indices according to $d_{k+}$ and $d_{k-}$;
   further comprising an operation of finding the maximum value $P_{max}$ from the correlation output and searching for other sequences from the correlation output.

21. The non-transitory computer-readable memory medium of claim 17, where the received signal comprises a random access preamble that is transmitted from a mobile communication apparatus and that is received at a network access node, where the computer-readable memory medium comprises part of the network access node and where the random access preamble is comprised of a Zadoff-Chu (ZC) sequence.

22. An apparatus, comprising
   a wireless receiver;
   a correlator configurable to correlate a received signal with a reference sequence to provide a correlation output; and
   a processor configurable to process the correlation output in the time domain to detect a presence of a first predetermined preamble sequence using a main correlation peak and two first order frequency shift peaks, said processor further configurable to null higher order frequency shift peaks from the correlation output prior to further processing the correlation output to detect a presence of a second predetermined preamble sequence.

23. The apparatus of claim 22, where said correlator correlates the received signal with a reference Zadoff-Chu (ZC) sequence, and further comprising an inverse discrete Fourier transform (IDFT) unit to provide a correlation output in the time domain;
   where said processor calculates a noise floor estimate $\sigma_{est}^2$ by counting a mean value of correlation output samples; and
   sets two detection thresholds: $T_1 = F_1 \sigma_{est}^2$ and $T_2 = F_2 \sigma_{est}^2$, where $F_1$ and $F_2$ are predefined threshold factors;
   where said processor excludes correlation peaks that exceed a certain level when calculating the noise floor estimate and is further configurable to null samples of the received signal that correspond to unused cyclic shifts.

24. The apparatus of claim 23, where said processor is further configurable to find a maximum value $P_{max}$ from the correlation output and to compare $P_{max}$ to $T_1$, and when $P_{max} > T_1$, continuing processing else nulling the index of $P_{max}$ and beginning again by correlating the received signal with a next reference sequence;
   where when processing continues said processor determines when $P_{max}$ resides in an uncertainty window of the main correlation peak, and when so the preamble corresponding to that uncertainty area is detected.

25. The apparatus of claim 24, where when $P_{max}$ is determined to be a main correlation peak at index $d_0$, said processor calculates indices of $d_{k+}$ and $d_{k-}$, while when instead $P_{max}$ is determined to be $d_{1+}$ based on its location in the correlation output, said processor calculates $d_0$, $d_{k+}$ and $d_{k-}$, where k determines the order of frequency shift peaks to be searched, where a sequence-specific cyclic shift offset $c_{off}$ is calculated as $$c_{off}=(N_G m-1)/u$$

where $N_G$ is the length of the sequence, u is the index of a mother sequence and m is a smallest positive integer for which $c_{off}$ is an integer, where a distance between a main correlation peak index $d_0$ and a k:th order frequency shift peak is calculated from:

$$d_{k+}=(d_0+kc_{off}) \bmod N_G, \text{ and}$$

$$d_{k-}=(d_0-kc_{off}) \bmod N_G,$$

where $d_{k+}$ is the location of the k:th order frequency shift peak in a positive direction and $d_{k-}$ is the location in a negative direction;

said processor is further configurable to combine $d_0$, $d_{1+}$ and $d_{1-}$ together to yield $P_{sum}$, and to compare $P_{sum}$ to $T_2$, where if $P_{sum} > T_2$, a sequence corresponding to the $P_{max}$ location in the correlation output is detected and timing can be estimated, where combining takes into account samples around the calculated $d_0$, $d_{1+}$ and $d_{1-}$ where when $d_0$ is calculated from $d_{1+}$ or $d_{1-}$, further comprising finding a maximum value between correlation output samples $d_0-1$, $d_0$ and $d_0+1$, and selecting the corresponding sample index as a new $d_0$.

26. The apparatus of claim 22, embodied as at least one integrated circuit.

* * * * *